US007984995B2

(12) United States Patent
Morrison et al.

(10) Patent No.: US 7,984,995 B2
(45) Date of Patent: *Jul. 26, 2011

(54) METHOD AND APPARATUS FOR INHIBITING A SUBJECT'S EYES FROM BEING EXPOSED TO PROJECTED LIGHT

(75) Inventors: Gerald Morrison, Calgary (CA); David E. Holmgren, Calgary (CA); Yunqiu (Rachel) Wang, Calgary (CA); Brian Howse, Calgary (CA); Alex Chtchetinine, Calgary (CA); Gregory G. Forrest, Calgary (CA)

(73) Assignee: SMART Technologies ULC (CA)

( * ) Notice: Subject to any disclaimer, the term of this patent is extended or adjusted under 35 U.S.C. 154(b) by 825 days.

This patent is subject to a terminal disclaimer.

(21) Appl. No.: 11/420,146

(22) Filed: May 24, 2006

(65) Prior Publication Data
US 2007/0273842 A1 Nov. 29, 2007

(51) Int. Cl.
*G03B 21/00* (2006.01)
(52) U.S. Cl. ............................ 353/121; 353/69; 353/122
(58) Field of Classification Search ................. 353/69, 353/70, 97, 121, 122; 345/647
See application file for complete search history.

(56) References Cited

U.S. PATENT DOCUMENTS

| | | | |
|---|---|---|---|
| 5,383,013 A | 1/1995 | Cox | |
| 5,704,836 A * | 1/1998 | Norton et al. | 463/36 |
| 5,844,565 A * | 12/1998 | Mizutani et al. | 345/581 |
| 6,361,173 B1 * | 3/2002 | Vlahos et al. | 353/97 |
| 6,483,485 B1 | 11/2002 | Huang et al. | |
| 6,529,992 B1 | 3/2003 | Thomas et al. | |
| 6,542,087 B2 | 4/2003 | Lin | |
| 6,704,824 B1 | 3/2004 | Goodman | |
| 6,754,725 B1 | 6/2004 | Wright et al. | |
| 6,775,014 B2 * | 8/2004 | Foote et al. | 356/621 |
| 6,789,903 B2 | 9/2004 | Parker et al. | |
| 6,811,267 B1 | 11/2004 | Allen et al. | |
| 6,860,604 B1 * | 3/2005 | Vlahos | 353/28 |
| 6,898,653 B2 | 5/2005 | Su et al. | |
| 6,906,704 B2 * | 6/2005 | Matsutani et al. | 345/204 |
| 6,984,039 B2 | 1/2006 | Agostinelli | |
| 6,986,030 B2 | 1/2006 | Shmueli et al. | |
| 7,165,844 B2 | 1/2007 | Kobori et al. | |
| 7,221,437 B1 | 5/2007 | Schaefer | |

(Continued)

FOREIGN PATENT DOCUMENTS
EP 1 566 726 A1 8/2005
(Continued)

OTHER PUBLICATIONS

James H. Stapleton; Linear Statistical Models; Wiley-Interscience; 1 edition (Jul. 14, 1995).*

(Continued)

*Primary Examiner* — Georgia Y Epps
*Assistant Examiner* — Bao-Luan Le
(74) *Attorney, Agent, or Firm* — Katten Muchin Rosenman LLP

(57) ABSTRACT

A method of inhibiting a subject's eyes from being exposed to projected light when the subject is positioned in front of a background on which an image is displayed comprises capturing at least one image of the background including the displayed image, processing the captured image to detect the existence of the subject and to locate generally the subject and masking image data used by the projector to project the image corresponding to a region that encompasses at least the subject's eyes.

44 Claims, 14 Drawing Sheets

U.S. PATENT DOCUMENTS

| | | |
|---|---|---|
| 7,230,685 B2 | 6/2007 | Suzuki et al. |
| 7,325,933 B2 * | 2/2008 | Kaise et al. ............ 353/97 |
| 2002/0093666 A1 | 7/2002 | Foote et al. |
| 2002/0097218 A1 | 7/2002 | Gutta et al. |
| 2002/0105482 A1 * | 8/2002 | Lemelson et al. .......... 345/7 |
| 2002/0113950 A1 * | 8/2002 | Vlahos ............ 353/97 |
| 2003/0046447 A1 | 3/2003 | Kouperchliak et al. |
| 2003/0182456 A1 | 9/2003 | Lin et al. |
| 2003/0204950 A1 | 11/2003 | Chou et al. |
| 2003/0225971 A1 | 12/2003 | Oishi et al. |
| 2004/0015965 A1 | 1/2004 | Sparks |
| 2004/0165154 A1 * | 8/2004 | Kobori et al. .......... 353/69 |
| 2004/0199909 A1 | 10/2004 | Goodman |
| 2004/0205778 A1 | 10/2004 | Wong et al. |
| 2004/0230710 A1 | 11/2004 | Goodman |
| 2005/0038934 A1 | 2/2005 | Gotze et al. |
| 2005/0097573 A1 | 5/2005 | Chrysanthakopoulos et al. |
| 2005/0117132 A1 * | 6/2005 | Agostinelli .......... 353/122 |
| 2006/0015676 A1 | 1/2006 | Oribe et al. |

FOREIGN PATENT DOCUMENTS

| | | |
|---|---|---|
| WO | 2004/040428 A1 | 5/2004 |

OTHER PUBLICATIONS

Windows 95, Microsoft, Aug. 24, 1995.*

ISR and Written Opinion for PCT/CA2007/000908 mailed Sep. 12, 2007 (10 pages).

* cited by examiner

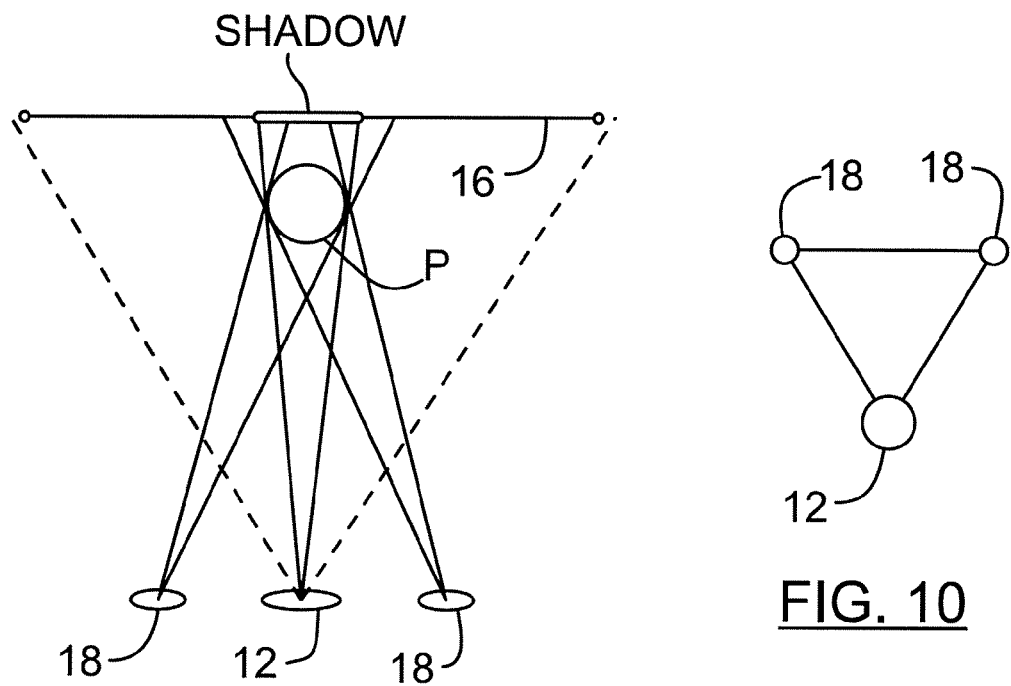
FIG. 9
FIG. 10
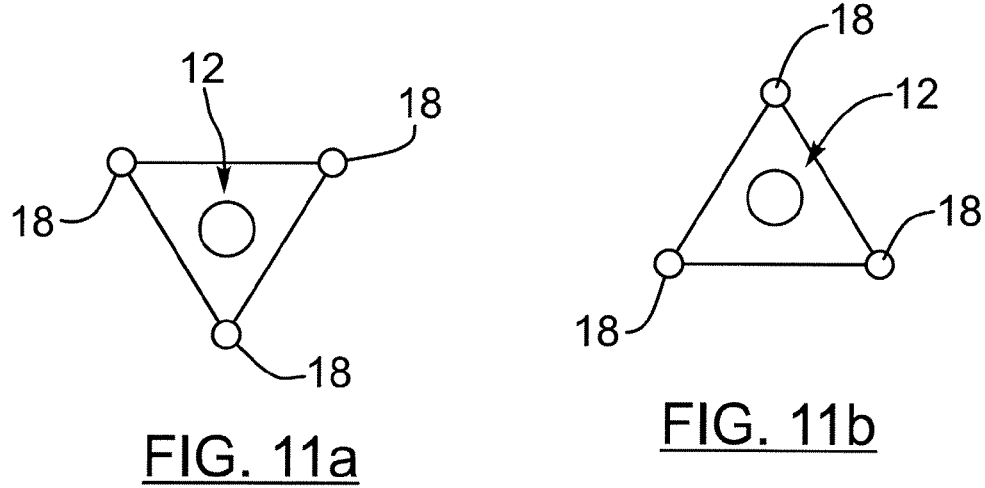
FIG. 11a
FIG. 11b

METHOD AND APPARATUS FOR INHIBITING A SUBJECT'S EYES FROM BEING EXPOSED TO PROJECTED LIGHT

FIELD OF THE INVENTION

The present invention relates generally to projection systems and in particular to a method and apparatus for inhibiting a subject's eyes from being exposed to projected light when the subject is positioned in front of a background on which a projected image is displayed.

BACKGROUND OF THE INVENTION

During presentations, use of a projector to project an image onto a projection screen so that the image can be seen by attendees is common. In many instances, presenters interact with the displayed images using a pointer to highlight and emphasize displayed information. During such interactions, presenters must often move between the projector and the projection screen and into the projected image. If the presenter moves into such a position and turns to face the audience, the projected light can be blinding. Subjecting a presenter's eyes to light of this nature is of course undesired.

Techniques to avoid exposing a presenter's eyes to projected light have been considered. For example, U.S. Pat. No. 6,361,173 to Vlahos et al. discloses a method and apparatus for inhibiting projection of selected areas of a projected image. The apparatus includes a video projector for projecting a desired video image onto a projection screen. An infrared source close to the video projector uniformly floods the projection screen with non-visible infrared radiation. An infrared sensitive camera, close to the video projector, observes the projection screen and sees only the uniform infrared illumination flooding the projection screen. Upon entry of a subject into the projected video image, the infrared radiation reflected from the subject will not match that of the projection screen and thus, the subject area can be identified. All pixels of the projected video image, in the area occupied by the subject, are inhibited before reaching the video projector. This allows the subject to look directly at an audience without being blinded by light projected by the video projector.

U.S. Pat. No. 6,860,604 to Vlahos discloses a method and apparatus for inhibiting the projection of a shadow of a presenter onto a projection screen. Left and right rectilinear corrections of an image are simultaneously projected onto the projection screen from each of two positions that are off-axis on opposite sides of the centerline of the projection screen such that both projections register as a single image. A center of mass of the presenter's silhouette is generated. A vertical join line is located on the projection screen directly behind the presenter's center of mass. The portion of the projected image from the left projector that extends to the right of the join line is inhibited. The portion of the projected image from the right projector that extends to the left of the join line is also inhibited thereby providing the full projected image on the projection screen from the left and right image segments, without either segment projecting the image onto the presenter and without casting the presenter's shadow onto the projection screen.

U.S. Pat. No. 6,945,653 to Kobori et al. discloses an antiglare device for a projector designed to minimize stimulus to the eyes of a presenter. A displayed image captured by a camera is compared with an input image signal to generate a difference image and thus, detect the location of the presenter. The input image signal is then masked so that pixels corresponding to the area at which the presenter is located are set to black. The resulting projected image signal is then projected onto the projection screen.

Although the above-references disclose techniques to inhibit projected light from being directed into the eyes of a presenter, the systems disclosed in these references suffer disadvantages. For example, although the systems disclosed in U.S. Pat. No. 6,361,173 to Vlahos et al. and U.S. Pat. No. 6,860,604 to Vlahos avoid light projected by the projector from being directed into the eyes of a presenter, the systems still expose the presenter's eyes to infrared light. Also, each of the above-described systems determines a tight-mask defining the location of the presenter and thus, requires high-resolution cameras.

As will be appreciated, there exists a need for a projection system designed to protect a presenter's eyes from virtually any form of projected light, which is easy to manufacture and cost effective. It is therefore an object of the present invention to provide a novel method and apparatus for inhibiting a subject's eyes from being exposed to projected light when the subject is positioned in front of a background on which a projected image is displayed.

SUMMARY OF THE INVENTION

Accordingly, in one aspect there is provided in a projection system where a projector is used to project an image for display on a background, a method of inhibiting a subject's eyes from being exposed to projected light when the subject is positioned between the projector and the background, said method comprising:

capturing at least one image of the background including the displayed image;

processing the captured at least one image to detect the existence of a subject and to locate generally the subject; and masking image data used by the projector to project the image, corresponding to a region that encompasses at least the subject's eyes.

During the masking, pixels in the region are set to a black or near black level. The region is geometrically shaped and generally encompasses the subject's head. During capturing, sets of images are successively captured and mapped to one another. Each set of mapped images is processed to yield a disparity image. The disparity image is processed to detect generally the center of the subject's head and the geometrically shaped region is generally centered about the center of the subject's head. In one embodiment, the disparity image is a statistical cross-correlation of each set of mapped images. In another embodiment, the disparity image is a weighted differential of each set of mapped images. In yet another embodiment, the disparity image is an absolute differential of each set of mapped images.

The images of each set are mapped to one another via a transformation determined during calibration. The transformation is a homography transformation based on common features in the captured images. The common features comprise features of a calibration image projected on the background. The calibration image is a graphical user interface.

According to another aspect there is provided in a projection system where a projector is used to project an image for display on a background, a method of inhibiting a subject's eyes from being exposed to projected light when the subject is positioned in front of the background, said method comprising:

successively capturing sets of images of the background including the displayed image;

processing each set of captured images to detect the existence of the subject and to locate generally the subject's head; and modifying image data used by the projector to project the image, in a region encompassing the subject's head such that the displayed image comprises an area of darkness encompassing the subject's head.

According to yet another aspect there is provided a projection system comprising:

a projector receiving image data and projecting an image onto a background;

at least one camera capturing images of the background including the projected image; and processing structure processing the captured images to detect the existence of a subject and to locate generally the subject and masking image data used by the projector to project the image, corresponding to a region that encompasses at least the subject's eyes.

According to still yet another aspect there is provided a projection system comprising:

a projector receiving image data and projecting an image onto a background;

a scanner scanning the background to detect the existence of a subject in front of the background; and processing structure communicating with the scanner, said processing structure being responsive to said scanner and masking the image data used by the projector to project the image corresponding to a region that encompasses at least the subject's eyes thereby to inhibit projected light from being directed at the subject's eyes.

The method and apparatus provide advantages in that captured images are analyzed to detect the existence of a subject so that the image projected onto the background is modified to inhibit projected light from being directed at the subject's eyes. Thus, neither visible light nor non-visible light is directed at the subject's eyes when the subject is positioned in front of the background on which the projected image is displayed.

BRIEF DESCRIPTION OF THE DRAWINGS

Embodiments will now be described more fully with reference to the accompanying drawings in which:

FIG. 9 is a top plan view of an alternative camera and projector arrangement for the projection system;

FIG. 10 is a front view of the camera and projector arrangement of FIG. 9;

FIGS. 11a and 11b are front views of further alternative camera and projector arrangements;

DETAILED DESCRIPTION OF THE EMBODIMENTS

Figure 1:
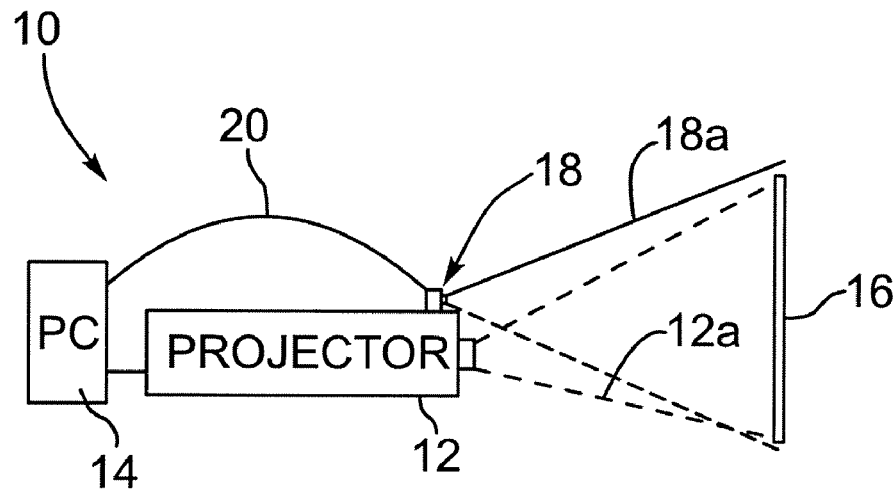
FIG. 1 is a schematic side view of a projection system including an apparatus for inhibiting a subject's eyes from being exposed to projected light.
Figure 2:
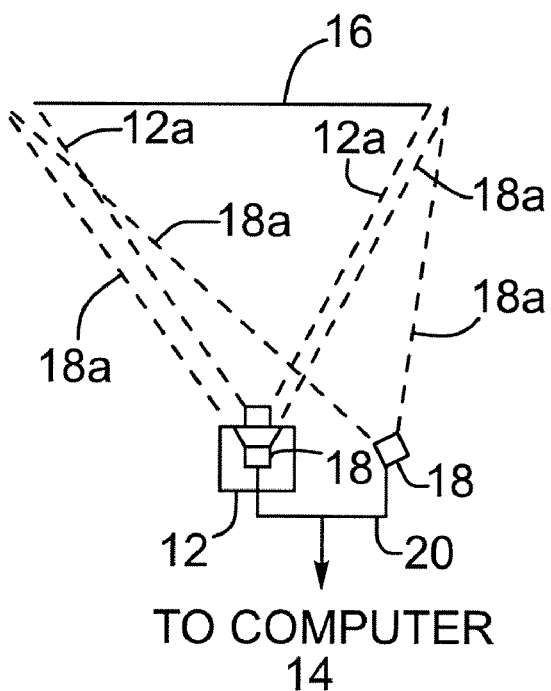
FIG. 2 is a top plan view of the projection system of FIG. 1.
Figure 3:
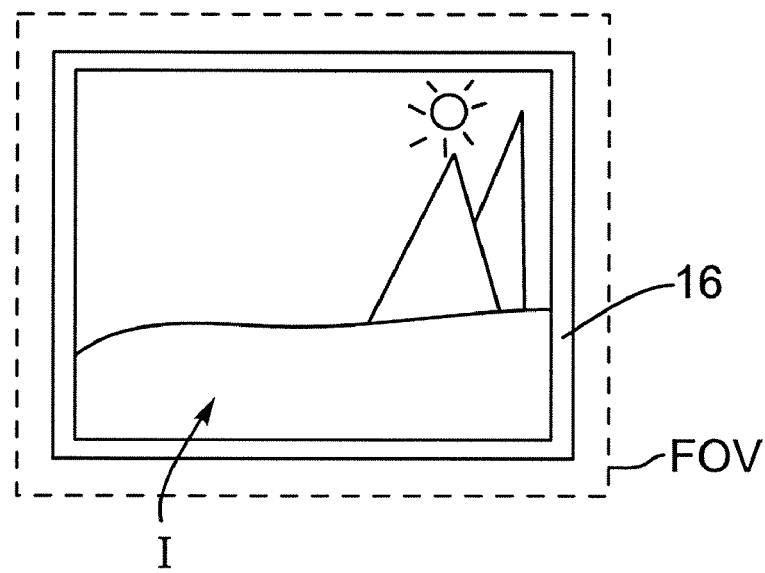
FIG. 3 is a front view of a projection screen on which a projected image is displayed.

Turning now to FIGS. 1 to 3, a projection system is shown and is generally identified by reference numeral 10. As can be seen, projection system 10 includes a projector 12 receiving an input video data stream from a processing device such as for example, a personal computer (PC) 14. Projector 12 in response to the input video data stream projects an image I onto a projection screen 16 as shown in FIG. 3 and by the dotted lines 12a in FIGS. 1 and 2. Projection screen 16 may be for example a passive writeboard, an interactive writeboard such as those manufactured by SMART Technologies, Inc. of Calgary, Alberta, Canada or simply a background wall surface. A pair of low resolution video cameras 18 is positioned adjacent the projector 12. The cameras 18 are horizontally spaced with one camera 18 being positioned in line with and above the projector 12 and the other camera 18 being positioned to the right side of the projector 12. Each camera 18 has a field of view (FOV) encompassing the projection screen 16 as shown in FIG. 3 and by the dotted lines 18a in FIGS. 1 and 2. In this manner, the cameras 18 capture images including the entire projection screen 16 and the image I displayed thereon as well as any objects, such as a presenter P, positioned in front of the projection screen 16. The cameras 18 are coupled to the personal computer 14 via universal serial bus (USB) connections 20.

To avoid a presenter P from being blinded by light projected by the projector 12 when the presenter is positioned in front of the projection screen 16, the projection system 10 makes use of image analysis to mask the input video data stream provided to the projector 12 so that pixels corresponding to a region generally encompassing the presenter's head are set to black or near black (i.e. dimmed). In this manner, the presenter P is able to stand in front of the projection screen 16 and look back at the projector 12 without being blinded by projected light.

Prior to general use of the projection system 10, the projection system 10 is calibrated. Calibration of the projection system 10 matches the views of the cameras 18 through an image transformation with respect to the surface of the projection screen 16 such that image superposition creates one image of the viewed scene. Foreground objects such as a presenter are separated from the plane of the projection screen 16 due to the effect of planar parallax and show up as two images of finite separation related to the stereo camera positions. The calibration is fully automated without requiring intervention from the presenter or requiring projecting of special images that are visible during calibration.

During calibration, a Windows® desktop or other conventional graphical interface having icons and rectangular or arbitrarily shaped objects as image "features" is displayed on the projection screen 16. The cameras 18 in turn capture images including the projection screen 16 and the calibration desktop displayed thereon. The captured image pair is conveyed to the computer 14 which uses an image corner detector such as the Harris or SUSAN corner detector to locate unique points corresponding to corners in the captured images. A list of located points for each captured image is in turn generated. Typically, many of the same points are found in each of the captured images as well as some non-matching "rogue" points. The two lists of points are then normalized for further numerical processing. Next, each of the points is combined into a Gaussian weighted proximity matrix of inter-point distances with cross correlation strengths, in the neighborhood of the points in the lists, indicating the association strength of each point in the lists with every other point in the lists.

The correlation-weighted proximity matrix G is then processed using singular value decomposition according to:

$$G=TDU'$$

The matrix, D, is replaced with a matrix, E, that has all diagonal elements Dii replaced with 1 and a new matrix, P, is computed according to:

$$P=TEU'$$

Each of the values Pij of matrix P, if maximum on both the row and column, represents a 1:1 correspondence pairing of points in the lists and hence detected matching corners in the captured images. The matrix P has the property of amplifying good pairings and attenuating bad pairings. The points in the lists that are found to be in 1:1 correspondence are further processed to compute a homography transformation matrix with an over-determined linear set of equations to solve that enables the images captured by the cameras 18 to be mapped to one another.

As will be appreciated, corners tend to be relatively easy to find in computer generated displays due to the nature of icons and view windows within graphical user interfaces. In addition, the captured images have strong corner features at the four extreme corners of the projection screen 16 providing information about the relative size and position of the projection screen in the view of the cameras 18.

Once calibrated, in use the personal computer 14 outputs a video data stream that is received by the projector 12. In response to the input video data stream, the projector 12 in turn projects an image I onto the projection screen 16. The cameras 18, which see the projection screen 16, the displayed image I and a presenter, if the presenter exists in their fields of view, capture images and convey the captured images to the personal computer 14 over the USB connections 20. Thus, the computer 14 receives pairs of images from the cameras 18.

Figure 4:
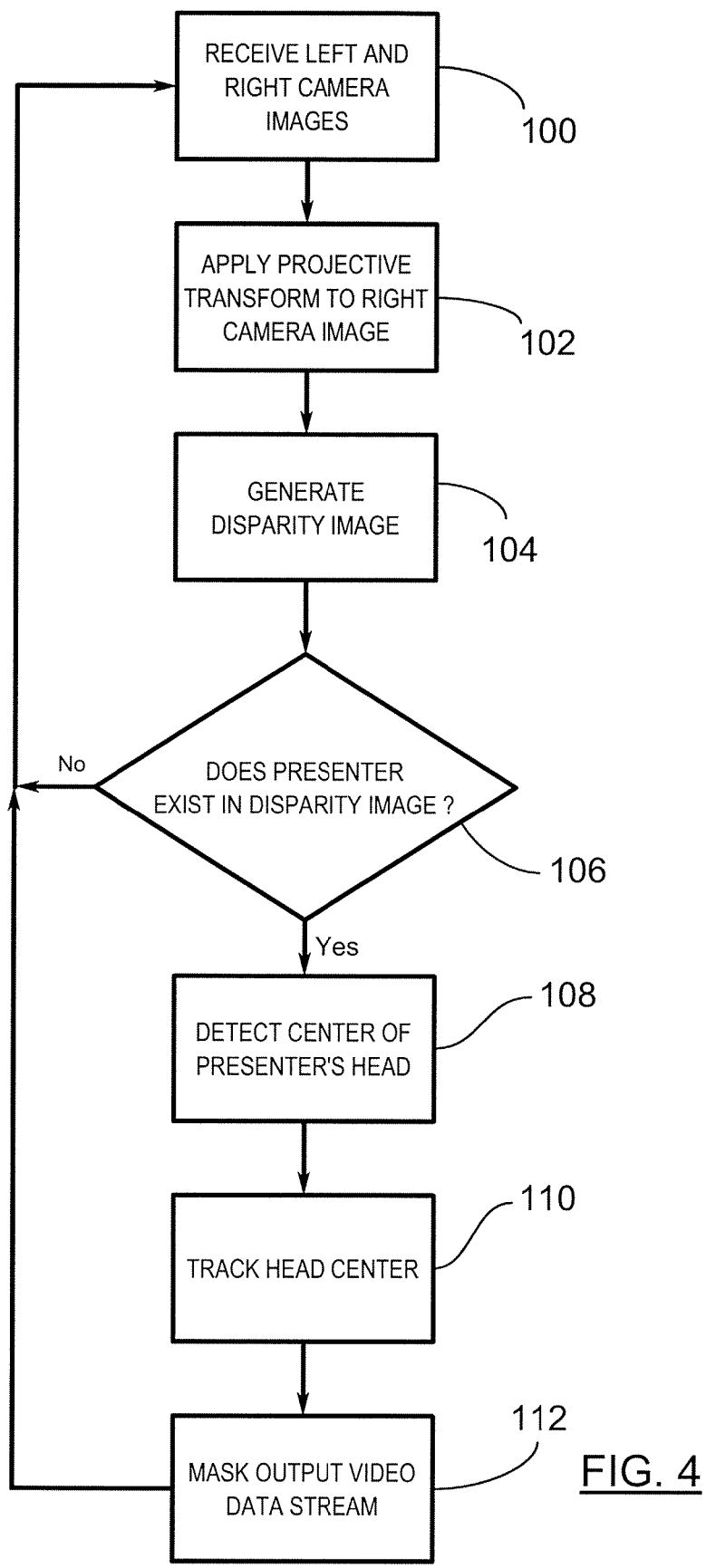
FIG. 4 is a flowchart showing the steps performed during processing of captured images to detect the presence of a presenter and to mask an output video data stream.

Upon receipt of each pair of images from the cameras 18, the computer 14 processes the images to detect whether a presenter is positioned in front of the projection screen 16 and if so, to determine the location of the presenter's head so that the video data stream input to the projector 12 can be masked to inhibit the presenter from being blinded by projected light. In particular as shown in FIG. 4, when the computer 14 receives the images from the cameras 18 (step 100), the computer 14 applies the homography transformation matrix calculated during calibration to the right camera image to transform the right camera image to the coordinate system of the left camera image (step 102). With the two images in the same coordinate system, a statistical cross-correlation between the images is performed to generate a "disparity" image (step 104). The disparity image is then examined to determine if a presenter exists in the disparity image (step 106). If the existence of a presenter is not detected, the camera images are discarded and the process reverts back to step 100 to await receipt of the next pair of camera images.

Figure 5:
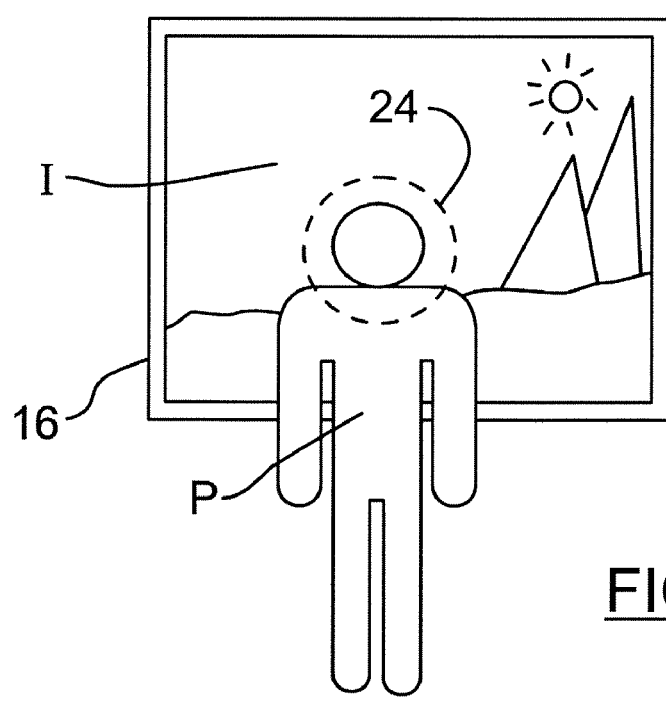
FIG. 5 is a front view showing a presenter positioned in front of the projection screen.

If the existence of a presenter is detected at step 106, the disparity image is further processed to detect the center of the presenter's head (step 108). With the center of the presenter's head detected, the presenter's head is tracked (step 110) and the average center position and velocity of the presenter's head over successive image pairs is used to mask the video data stream so that pixels corresponding to a circular region encompassing the presenter's head are set to black or near black (step 112). As a result, when the video data stream is output to the projector 12, projected light is inhibited from being directed at the presenter's eyes as a circular area of darkness 24 encompasses the presenter's head as shown in FIG. 5. As the cameras 18 continually capture images of the projection screen 16 and displayed image I, movement of the presenter P is tracked allowing the area of darkness 24 to be moved to follow the presenter.

Figure 6:
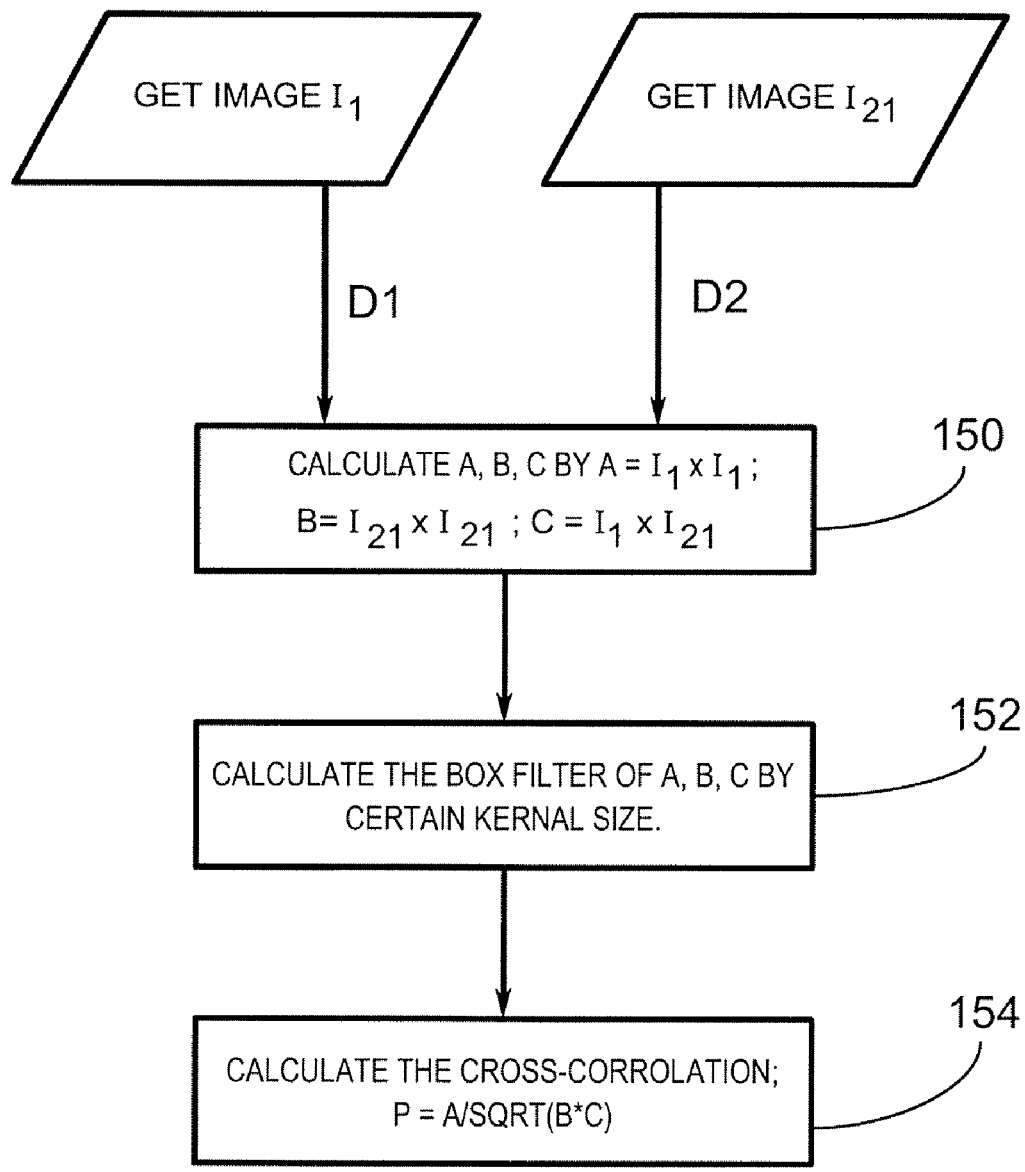
FIG. 6 is a flowchart showing the steps performed during processing of captured images to generate a disparity image.

At step 104, during generation of the disparity image, images A, B and C are initially calculated (see step 150 in FIG. 6) according to:

$$A=I_{LC} \times I_{LC}$$

$$B=I_{TRC} \times I_{TRC}$$

$$C=I_{LC} \times I_{TRC}$$

where:

$I_{LC}$ is the image captured by the left camera; and $I_{TRC}$ is the transformed image captured by the right camera.

A box filter of the appropriate kernel size is then applied to each image A, B and C (step 152). The statistical cross-correlation is then calculated to generate the disparity image P (step 154) according to:

$$P=A/\mathrm{sqrt}(B \times C)$$

The equation used to generate the disparity image is subject to a divide by zero (or close to zero) exception during tracking of dark objects in the captured images. Hardware and/or software interrupts are therefore employed to replace such divide by zero exceptions with numbers that are in a range that will yield a reasonable result. Overexposing the cameras 18 such that dark objects do not appear as absolute black and have some minimal level of illumination can also be performed to avoid the divide by zero exceptions.

Alternatively, the disparity image may be found by filtering a difference image based on the captured left and transformed right captured images or by generating a Gaussian weighted difference image based on the captured left and transformed right captured images. As will be appreciated, in these instances, the complexity of calculating a square root and performing a divide operation are avoided.

Figure 7A:
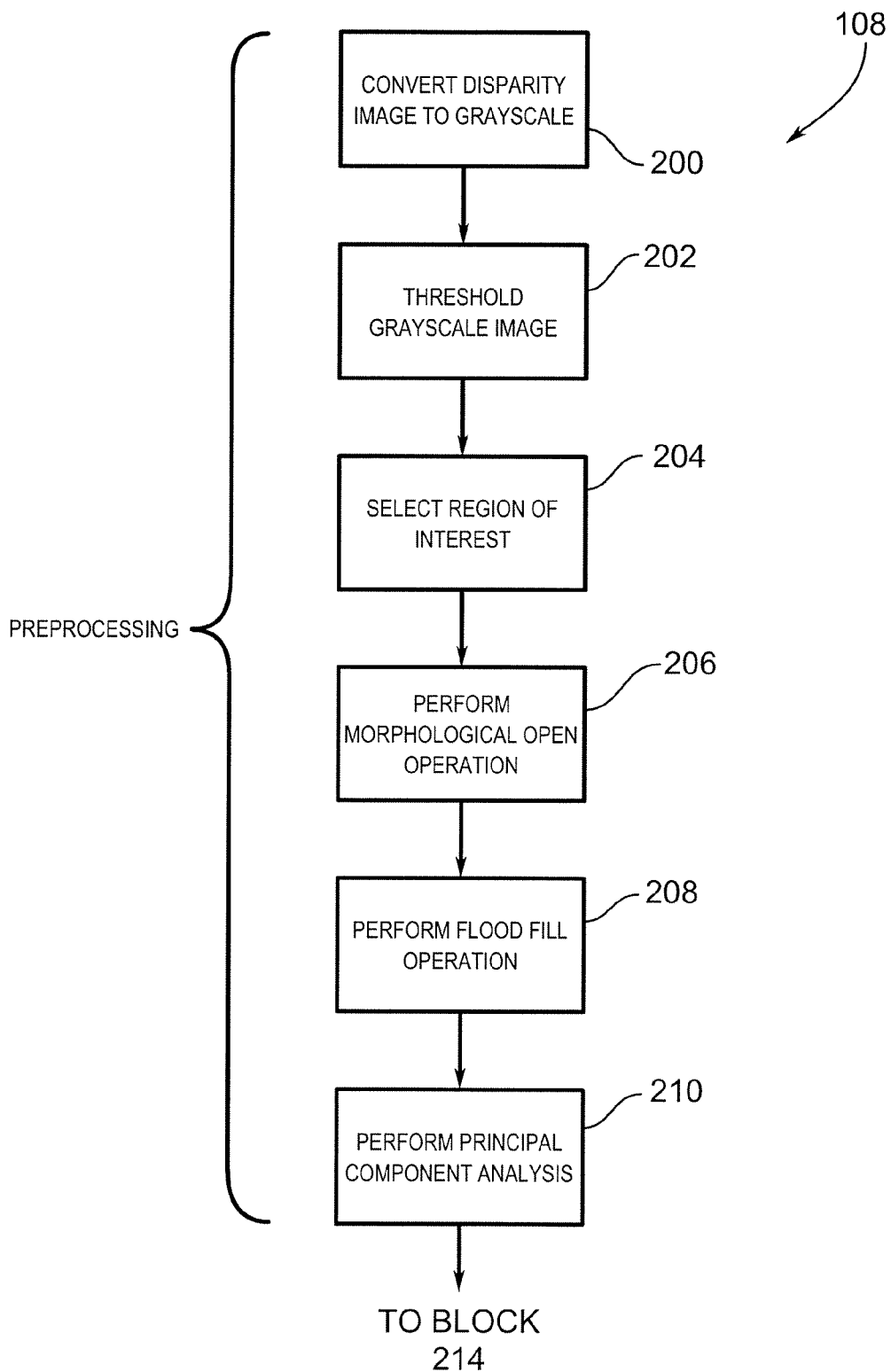
FIGS. 7a and 7b are flowcharts showing the steps performed during processing of captured images to detect the center of the presenter's head.

During step 108, in order to detect the location of the presenter's head, the disparity image is initially preprocessed. During preprocessing as shown in FIG. 7a, the disparity image is firstly converted to greyscale so that the pixel values are in the range of 0 to 255 (step 200). The greyscale image is then thresholded (step 202). During thresholding, pixels having values above 245 and below 220 are set to black and pixels having values in the range of 220 to 245 representing a disparity (i.e. an object in front of the projection screen 16) are set to white. A region of interest (ROI) within the thresholded image that encompasses the majority of the white pixels is then selected (step 204). A morphological open operation is then performed on the thresholded image to remove noise (step 208) and a flood fill operation is performed (step 208) to remove white pixel clusters that are smaller than a threshold size, in this example smaller than 2% of the projection screen area in the captured images. In this manner, the remaining white pixel clusters representing the presenter are isolated. The center (x,y) of the presenter is calculated based on the white pixel clusters in the region of interest (ROI). A principle component analysis is then performed on the white pixel clusters in the ROI (step 210) to detect the major axis of the presenter, the minor axis of the presenter and the orientation of the major axis with respect to the vertical.

Figure 7B:
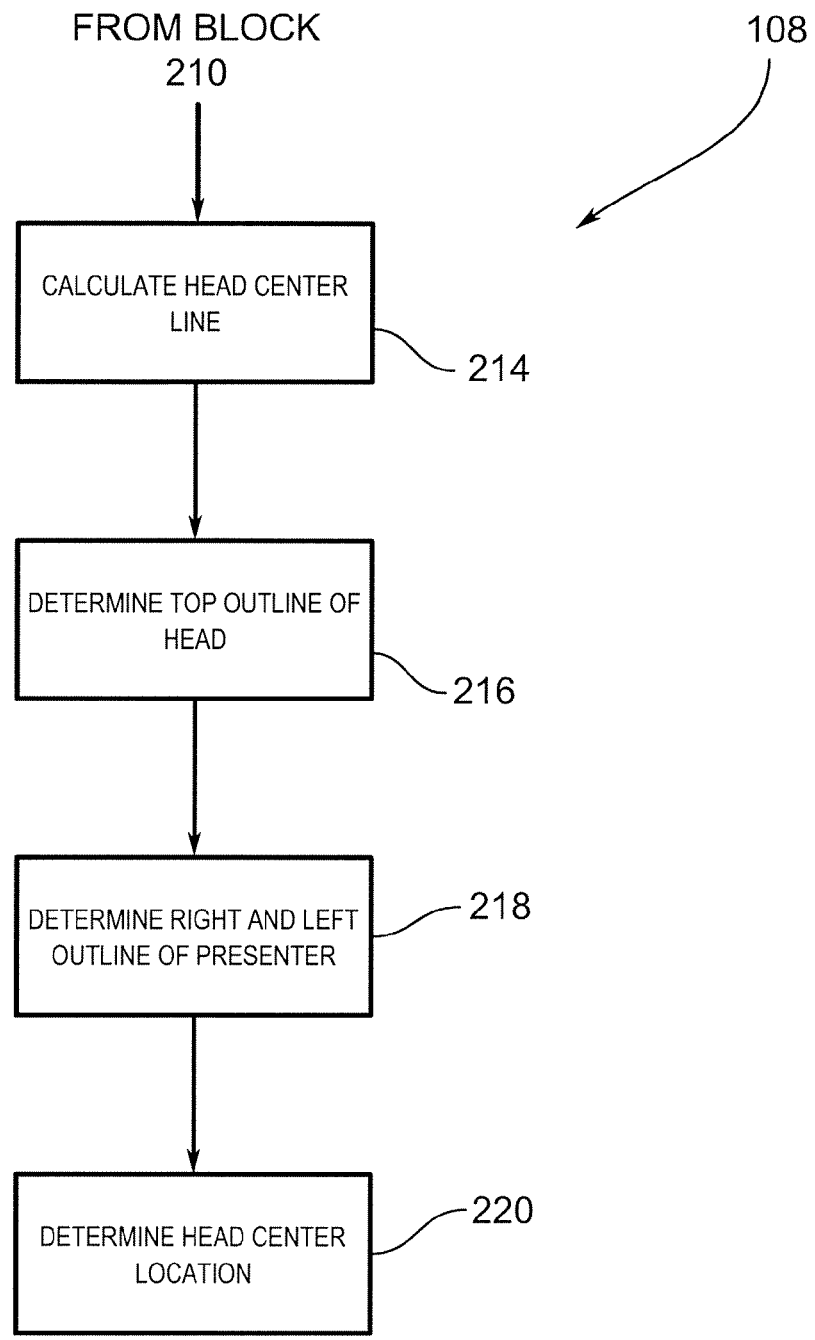

With the disparity image preprocessing completed, the principle component analysis results are used to calculate the centerline of the presenter's head and top of the presenter along the center line (step 214 in FIG. 7b). The top outline of the presenter's head is then calculated and possible head positions are determined (step 216). Following this, the right and left side outlines of the presenter are calculated and the actual head position is determined (step 218). With the head position determined, the center of the presenter's head is calculated (step 220). During processing of the outlines, to enhance detection of the presenter's head, one or two mathematical profiles referred to as rotational profiles may be fitted to the outline to locate the presenter's head.

Figure 8:
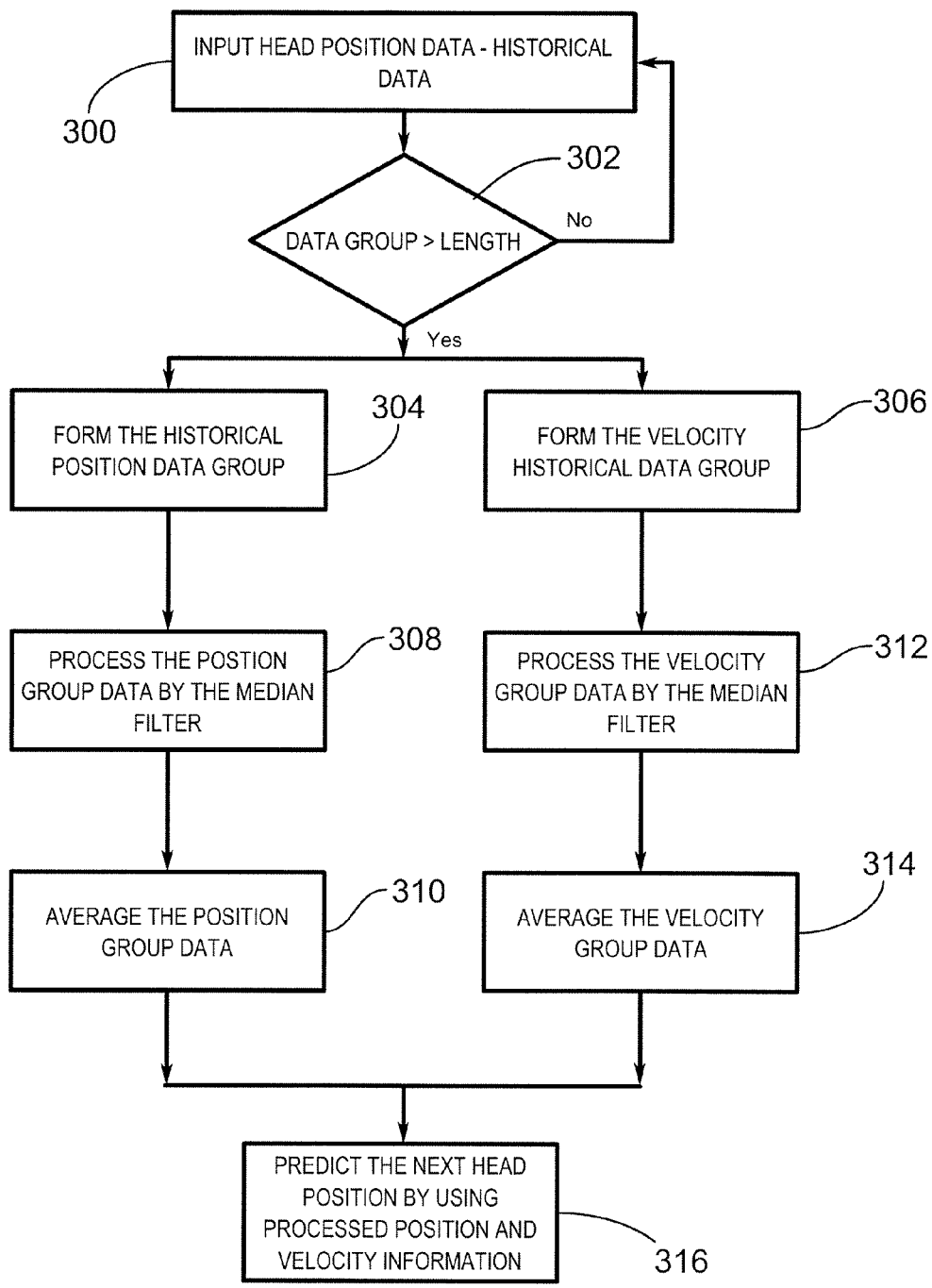
FIG. 8 is a flowchart showing the steps performed during processing of captured images to track the center of the presenter's head.

At step 110, during tracking, after the center position of the presenter's head has been calculated at step 220, the center position is stored in memory (step 300 in FIG. 8). A check is then made to determine if a threshold number of center positions are stored in the memory (step 302). If not, the process reverts back to step 300 awaiting the next calculated head center position. If a threshold number of center positions exist, a historical center position data group and a historical velocity data group are formed (steps 304 and 306). A median filter is then applied to the historical center position data group (step 308) and an average center position ($X_{ay}$, $Y_{ax}$) is calculated (step 310) A median filter is also applied to the historical velocity data group (step 312) and an average velocity ($V_{ax}$, $V_{ay}$) is calculated (step 314). The average center position and average velocity is then used to predict a position ($P_x$, $P_y$) representing the center of the presenter's head (step 316) according to:

$$P_x = X_{ay} + V_{ax}\Delta t$$

$$P_y = Y_{ax} + V_{ay}\Delta t$$

This center position ($P_x$, $P_y$) is used to calculate a circular mask encompassing the presenter's head (step 312). The pixels of the video data stream falling within the circular mask are then dimmed as described above so that when the video data stream is input to the projector 12 and a resultant image is projected on the projection screen 16, the area of darkness 24 encompasses the presenter's head inhibiting the presenter from being blinded by projected light.

As will be appreciated, the projection system 10 tracks a presenter moving in front of the projection screen 16 and masks the video data stream input to the projector 12 to inhibit the presenter from being blinded.

The camera images may of course be processed in other ways to detect the presenter's head. For example, in an alternative embodiment, upon receipt of the images from the cameras 18, the computer 14 initially equalizes the images to compensate for differences in exposure level prior to transforming the right camera image to the coordinate system of the left camera image. A weighted differential image based on the left camera image and transformed right camera image is then calculated thereby to yield a disparity image. The disparity image is then examined to determine if a presenter exists in the disparity image (i.e. if the disparity image includes a number of non-zero pixels above a threshold). If a presenter exists in the disparity image, the disparity image is thresholded. The threshold value is based on the input images received from the cameras 18 and the weighted differential image. Morphological operations are performed on the thresholded image and features corresponding to the presenter's head are extracted. A differential image using the current image and the previously generated image is then calculated and examined to detect presenter motion in successive image pairs. If presenter motion is detected, the thresholding is dynamically adjusted to improve the head feature extraction. The extracted head feature and detected presenter motion, if any, are used to calculate and track the head center position. This head center position data is then used to apply the mask to the video data stream as discussed above.

Alternatively, the cameras 18 may be calibrated to set camera exposure parameters to reduce differences in exposure levels of the left and right camera images. Where the cameras 18 cannot be calibrated to set the exposure parameters, a greyscale level transfer function is generated and an absolute differential image is calculated. Depending on the sum of pixel values, a decision is made as to whether a presenter exists in the differential image. If a presenter exists in the image, a threshold is applied to the differential image to yield a binary disparity image. Morphological operations and feature filtering are performed on the thresholded image and features corresponding to the presenter's head are extracted. A time differential image using the current image and the corresponding image from the previous frame is generated and threshold to detect presenter motion in successive image pairs. If presenter motion is detected, the thresholding is dynamically adjusted to improve the head feature extraction. The extracted head feature and detected presenter motion, if any, are used to calculate and track the head center position. This head center position data is then used to apply the mask to the video data stream as discussed above.

Although the calibration method described above uses a corner detector to determine points in the captured images representing corners, if desired the calibration method can be extended from points to lines using properly parameterized equations of straight edges to locate straight lines in the captured images. Those of skill in the art will however appreciate that lens distortion can increase the complexity of line finding methods due to inherent curvature of otherwise straight lines. If desired, color information may be used to further improve the results of the correlation-weighted proximity matrix by performing the correlation on RGB triplets.

Although the calibration method makes use of a typical desktop image, other calibration images can be used such as a pre-configured overlay image having desirable features to locate. For example, the calibration image may be an alpha-numeric company logo and/or registered trademarks that have aesthetic appeal yet offer repeatable calibration results. The company logo can be designed as a plug-in image module that is customizable by the presenter.

Turning now to FIGS. 9 and 10, an alternative camera and projector arrangement for the projection system 10 is shown. In this example, the cameras 18 are horizontally spaced, with each camera being positioned on either side and above the projector 12. In this manner, the cameras 18 and projector 12 form an inverted isosceles triangle. The optical axes of the cameras 18 are horizontal and parallel to one another.

In this embodiment, rather than processing the camera images to detect the presenter in the camera images, the camera images are processed by the computer 14 to detect the presenter's shadow on the projection screen 16, which in turn is used to locate the presenter. During processing, as in the previous embodiments the right camera image is initially transformed. The camera images are then processed to detect the outline of the presenter's shadow. As will be appreciated, the shadow will appear as a dark region compared to other areas of the camera images. The presenter's shadow is then analyzed to detect the presenter's head and the circular mask encompassing the presenter's head is calculated. The calculated circular mask is then applied to the video data stream output to the projector 12.

To avoid the area of darkness 24 appearing on the projection screen 16 that encompasses the presenter's head from being treated as a shadow, the circular mask is selected to be greater than the outline of the presenter's head. Selected pixels within the circular mask are not set to black so that a small amount of light within the area of darkness 24 exists. Thus, a real shadow is still created allowing the computer 14 to distinguish between real and artificial shadows.

Turning now to FIGS. 11a and 11b, further alternative camera and projector arrangements for the projection system are shown. In these examples, each arrangement comprises three cameras 18 arranged to form an isosceles triangle. The lens of the projector 12 is positioned at the center of the triangle. Although the orientation of the triangle defined by the cameras 18 is arbitrary, for symmetry and aesthetics, it is preferred that the vertex of the triangle be positioned either below the projector 12 as shown in FIG. 11a or above the projector as shown in FIG. 11b.

In yet an alternative embodiment, rather than using a pair of cameras, a single camera 18 in line with and above the projector 12 is used to capture images of the projection screen 16. In this embodiment, during processing of each captured image to detect the presence of the presenter P, each captured image is analyzed by the computer 14 to detect the boundary B of the displayed image I on the projection screen 16 (see FIG. 12 and step 400 in FIG. 13). This is done by examining each captured image to detect a sharp bright to dark transition that is generally rectangular in shape and near the outer edges of the captured image. With the boundary B of the displayed image I known, the existence of the presenter P is determined by examining the lower edge LE of the image boundary to detect an interruption in the lower edge LE (step 402). With the existence of the presenter determined, the midpoint of the presenter is calculated followed by a presenter centerline (step 404). A rectangular mask extending along the centerline is then calculated and applied to the video data stream.

Figure 14:
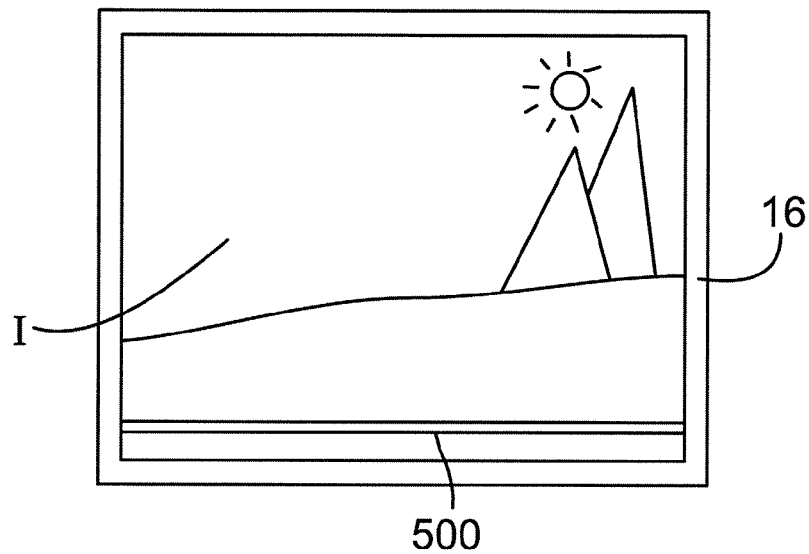
FIG. 14 is a front view of the projection screen having a projected image displayed thereon, the displayed image including a subject detection band.

In the above-described embodiment, although the existence of the presenter P is determined by finding the boundary of the displayed image and then locating an interruption in the lower edge of the displayed image boundary, alternatives are available. For example, turning to FIG. 14, in this embodiment, the video data stream output by the personal computer 14 is modified so that a narrow, generally horizontal bright white band 500 appears in the displayed image I adjacent its lower boundary. In this case, during image processing, the camera 18 processes each captured image to locate the bright white band 500 and any interruption therein signifying the existence of the presenter P.

Figure 15:
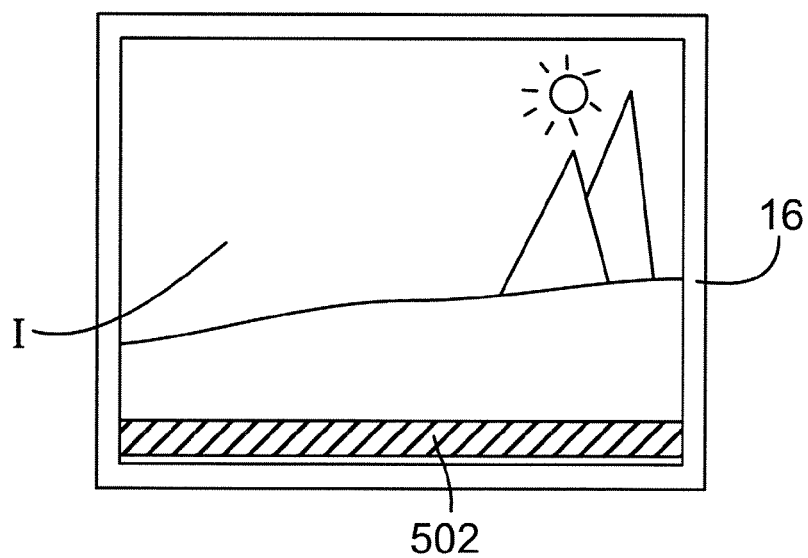
FIG. 15 is a front view of another embodiment of a projection screen on which a projected image is displayed.

Alternatively, rather than modifying the video data stream, a strip of highly reflective or retro-reflective material 502 can be provided adjacent the lower edge of the projection screen 16 as shown in FIG. 15. The reflective or retro-reflective strip 502 is positioned so that it is encompassed by the displayed image I and thus, reflects projected light. As a result, a generally horizontal bright white band appears in captured images. In this case, during image processing, the camera 18 processes each captured image to locate the bright white band and any interruption therein signifying the existence of the presenter P. As will be appreciated, when using a strip 502 of retro-reflective material, the camera 18 should be positioned very close to the lens of the projector 12.

In the above embodiments involving a single camera, rather than using the computer 14 to perform all of the processing, the captured images may be processed by the camera to detect the existence of the presenter P if the camera has on-board processing capabilities.

Figure 16:
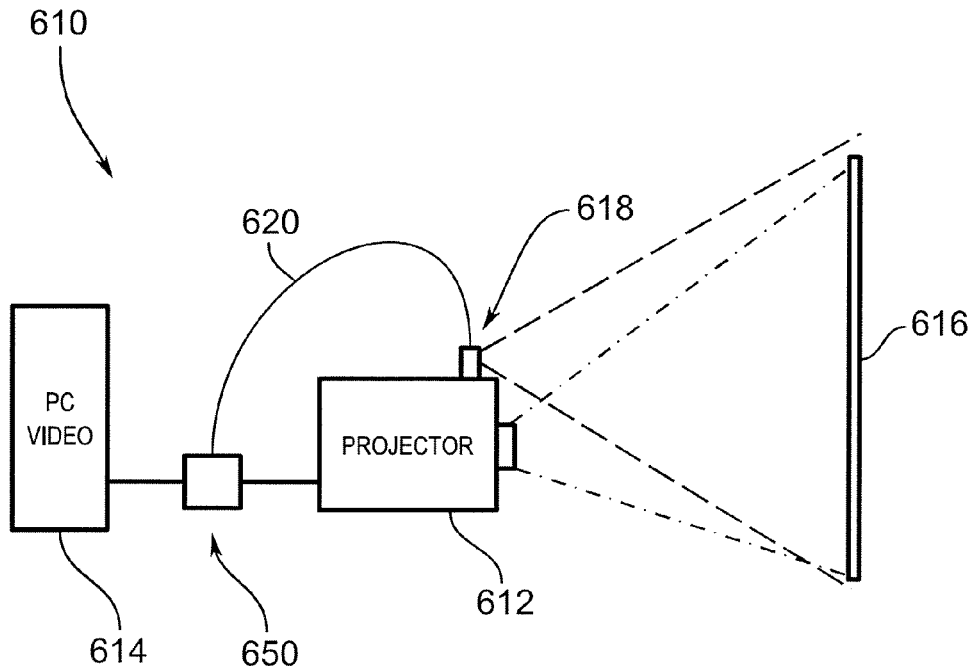
FIG. 16 is a schematic side view of a projection system including another embodiment of an apparatus for inhibiting a subject's eyes from being exposed to projected light.

Turning now to FIG. 16, yet another embodiment of a projection system is shown and is generally identified by reference numeral 610. As can be seen, in this embodiment, the projection system 610 includes a projector 612 that projects an image to be displayed onto a projection screen 616. A single, low resolution camera 618 is positioned adjacent the projector 612 and has a field of view encompassing the projection screen 616. In this manner, the camera 618 captures images including the entire projection screen 616 and the image displayed thereon. The camera 618 is coupled to a pixel interceptor 650 via a universal serial bus (USB) or other suitable connection 620. Pixel interceptor 650 receives a video data stream output by a video source 614 such as for example a personal computer, DVD player etc. and outputs a modified video data stream to the projector 612. As in the previous embodiments, the video data stream provided to the projector 612 is masked to ensure that light projected by the projector is inhibited from being directed at the presenter's eyes.

In this embodiment, the camera 618 processes each captured image to detect the existence of the presenter and the presenter centerline. Rather than the presenter centerline information being conveyed to the personal computer 614 for processing, the presenter centerline information is conveyed to the pixel interceptor 650. The pixel interceptor 650 uses the presenter centerline information to mask the received video data stream in the same manner described previously with reference to FIGS. 12 and 13. Thus, the pixel interceptor 650 uses the presenter centerline information to set pixel data corresponding to a rectangular region generally encompassing the presenter to black or near black thereby to ensure that the resulting area of darkness 24 in the projected image inhibits its light from being directed at the presenter's eyes.

Figure 12:
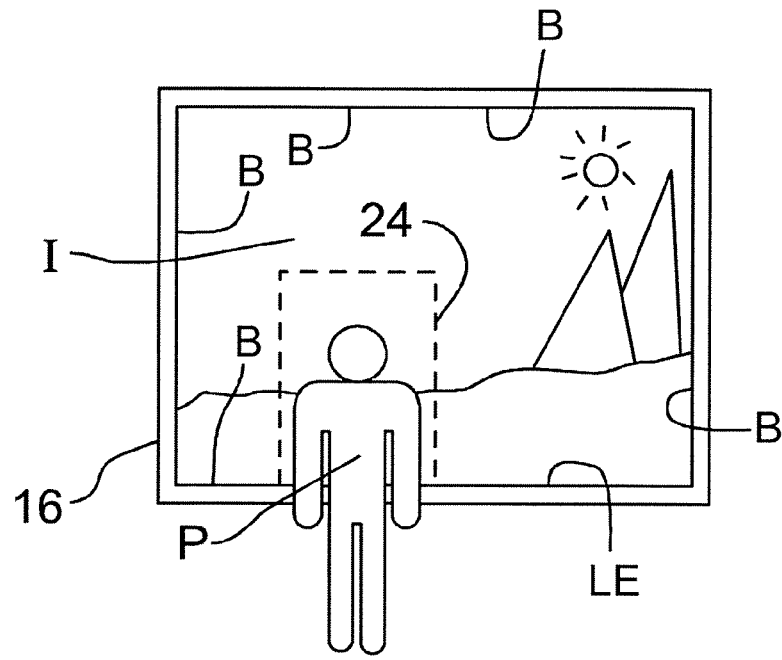
FIG. 12 is a front view showing a presenter positioned in front of the projection screen.
Figure 13:
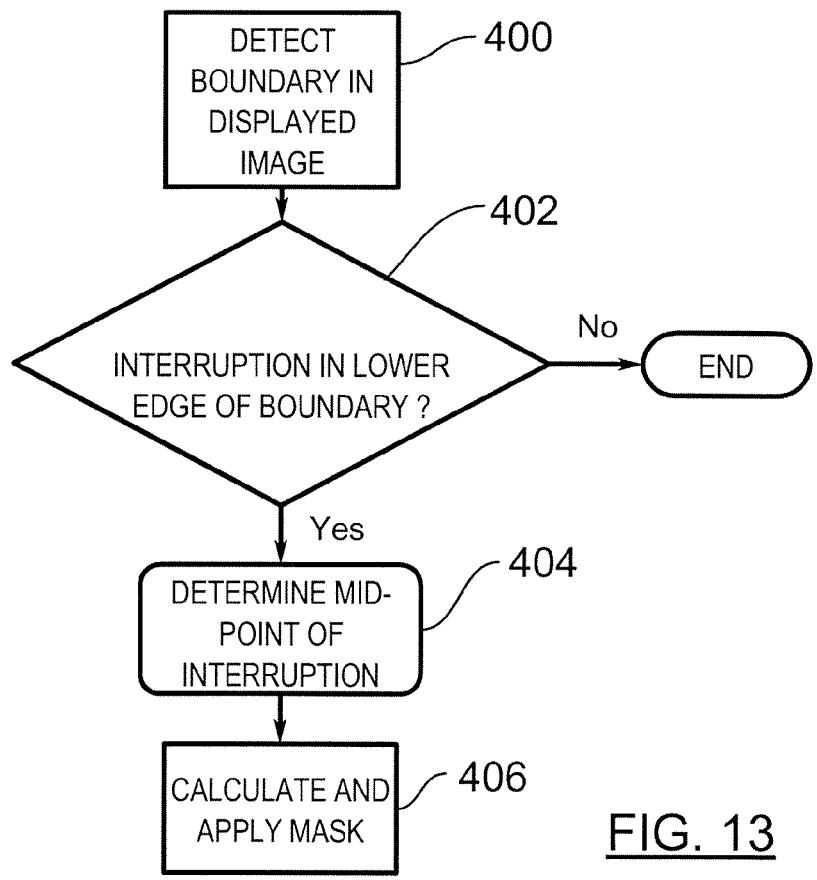
FIG. 13 is a flowchart showing alterative steps performed during processing of captured images to detect the presence of a presenter and to mask an output video data stream.

In the embodiments shown in FIGS. 12 and 16, the camera is shown as being positioned adjacent the projector. Positioning the camera adjacent the projector is typically convenient as connections to a power source and the video data source are readily available. If a strip of retro-reflective material 502 is not used in the detection of a presenter's existence, those of skill in the art will appreciate that the camera need not be positioned adjacent the projector. The camera can be positioned basically at any location provided its field of view encompasses the displayed image and projection screen.

Figure 17:
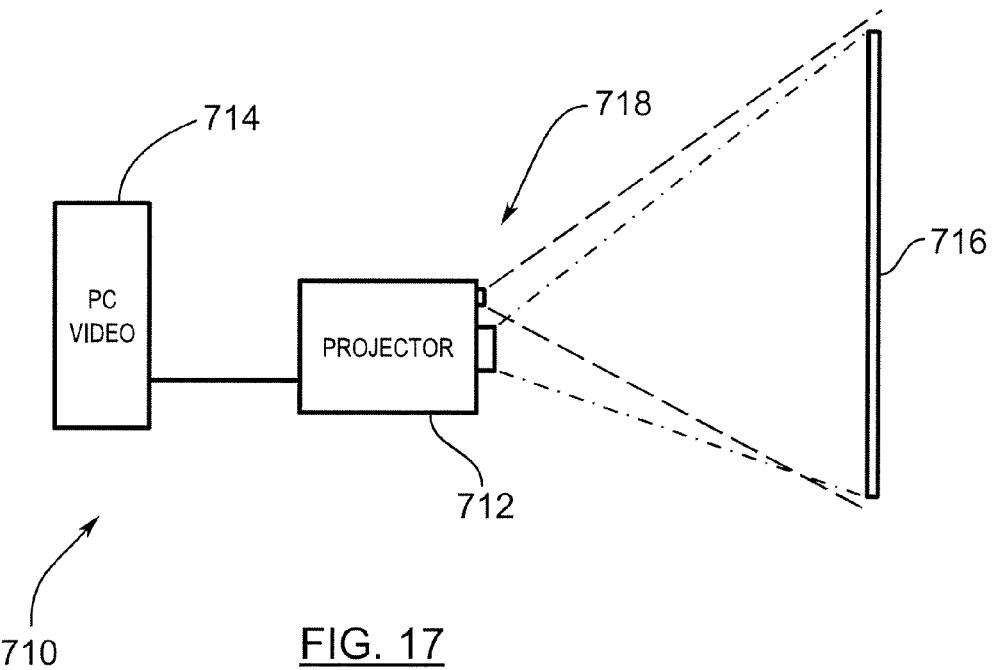
FIG. 17 is a schematic side view of a projection system including yet another embodiment of an apparatus for inhibiting a subject's eyes from being exposed to projected light.

Turning now to FIG. 17, yet another embodiment of a projection system is shown and is generally identified by reference numeral 710. As can be seen, in this embodiment, the projection system 710 includes a projector 712 that projects an image to be displayed onto a projection screen 716. A single, low resolution camera 718 is built into the projector and has a field of view encompassing the projection screen 716. In this manner, similar to the embodiments of FIGS. 12 and 16, the camera 718 captures images including the entire projection screen 716 and the image displayed thereon. The projector 712 in this example also includes a built-in pixel interceptor. The projector 712 receives a video data stream output by a video source 714 such as for example a personal computer, DVD player etc. Prior to using the input video data stream to project an image, the projector 712 modifies the video data stream to ensure that light projected by the projector 712 is inhibited from being directed at the presenter's eyes.

Figure 18A:
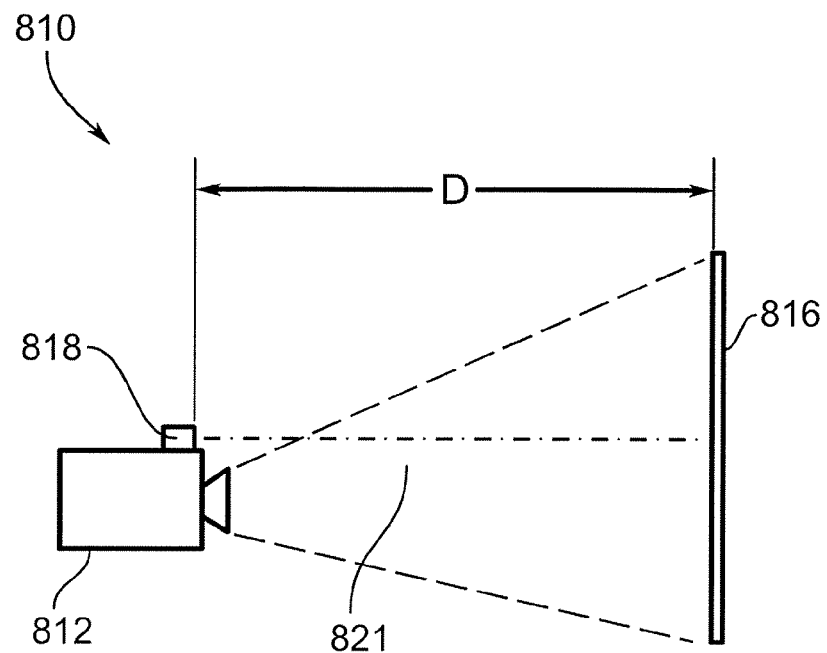
FIGS. 18a and 18b are schematic side views of a projection system including yet another embodiment of an apparatus for inhibiting a subject's eyes from being exposed to projected light.
Figure 18B:
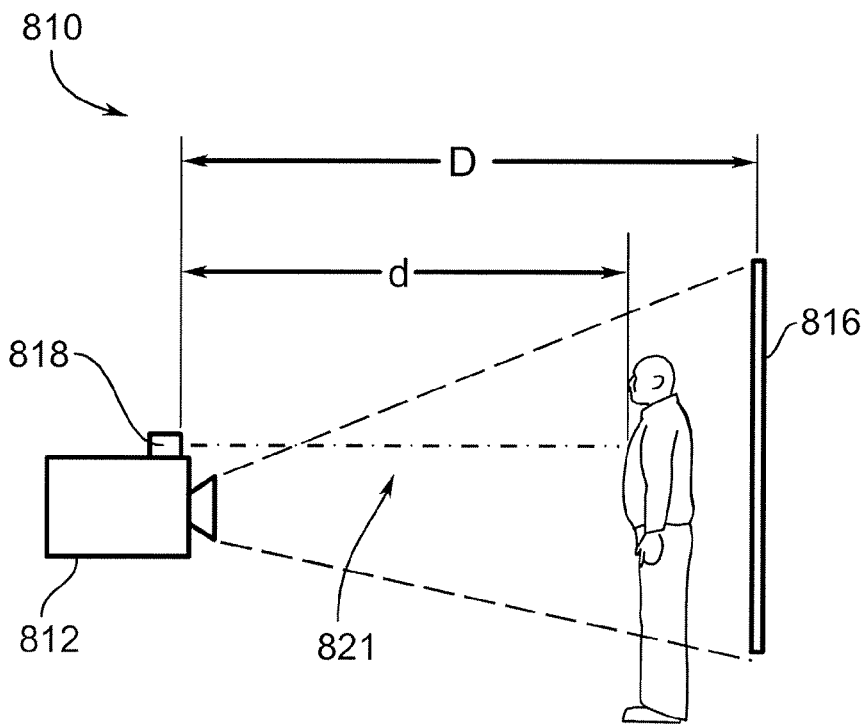

Turning now to FIGS. 18a and 18b, yet another embodiment of a projection system 810 is shown. In this embodiment, rather than using one or more cameras to capture images to detect the presence of a presenter in front of the projection screen 816, a range finder 818 is disposed on the projector 812. The range finder 818 projects a beam 821 of sound, light or radio waves towards the projection screen 816 that is used to scan the projection screen. When a presenter is disposed in front of the projection screen 816, the projected beam 821 is reflected back towards the range finder 818 and is received by the range finder sooner than if the beam 821 had reached the projection screen 816 allowing the existence and position of the presenter to be determined. The range finder output is conveyed to the computer 14 and is processed to locate the position of the presenter. As in the previous embodiments, the presenter location is used to mask the video data stream output to the projector 812 to inhibit the presenter from being blinded by projected light. If desired, the projected beam 821 can be swept outside of the area of the projection screen 816 to allow pre-emptive shading by detecting the existence of the presenter before the presenter moves in front of the projection screen.

During processing, the computer 14 compares the range finder output along each horizontal image scan line with calibration values. The calibration values represent the elapsed time taken for the beam 821 to reflect back from the projection screen 816 in the absence of a presenter. In this manner, the existence and location of the presenter can be determined.

If desired, the range finder 818 can be used in conjunction with one or more cameras. In this instance, the range finder information is used by the computer 14 to quickly identify the location of the presenter. Using this location information, the appropriate areas of the captured camera images are processed so that the video data stream output to the projector 812 can be masked to inhibit the presenter from being blinded by projected light.

Figure 19:
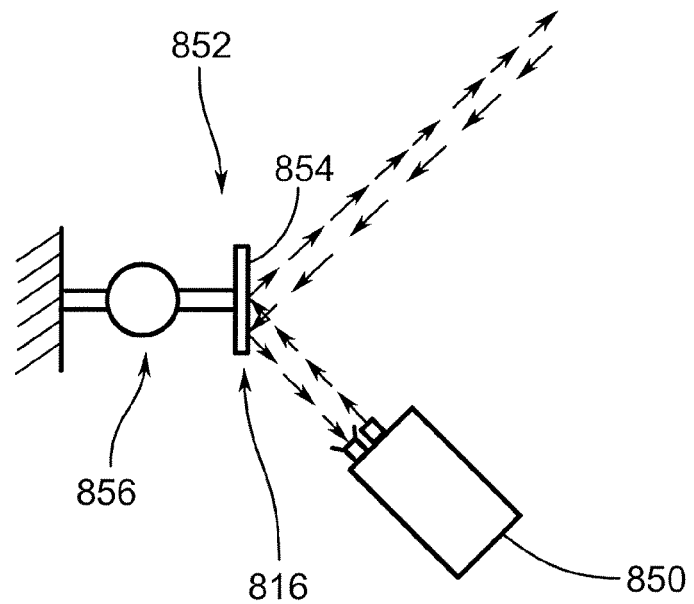
FIG. 19 is a schematic side view of a light beam generator and receiver and an associated scanning mechanism.

Alternatively, rather than using a range finder, as shown in FIG. 19, a light beam generator and receiver 850 in combination with a scanning mechanism 852 can be used to scan the projection screen 816 to detect the existence and location of a presenter. In this embodiment, the scanning mechanism 852 comprises a mirror 854 that is pivoted about a spherical joint 856 by an actuator (not shown) to scan a light beam generated by the light beam generator and receiver 850 horizontally across the projection screen. Reflected light returning to the mirror 854 is reflected back onto the light beam generator and receiver 850. Assuming that light reflected off of the presenter has a lower optical power than light reflecting off of the projection screen 816, the existence and location of the presenter can be determined.

Figure 20:
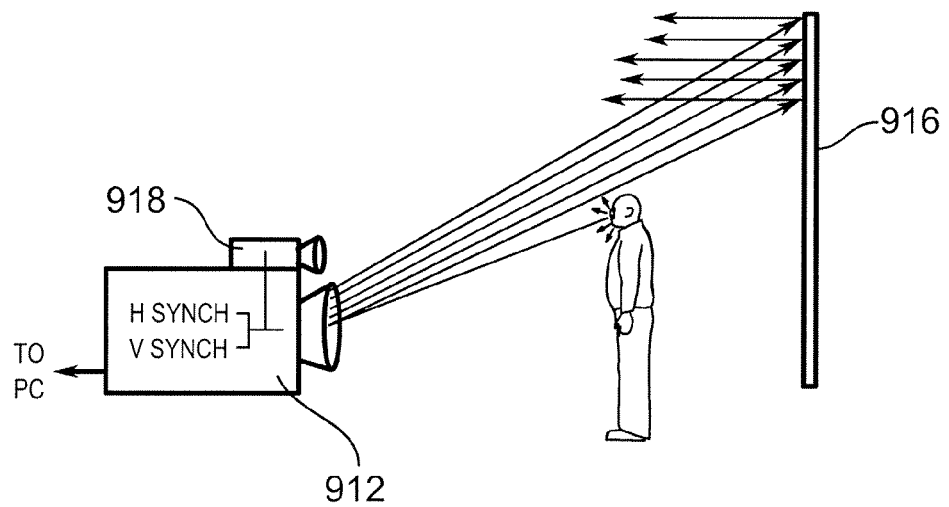
FIG. 20 is a schematic side view of a projection system including still yet another embodiment of an apparatus for inhibiting a subject's eyes from being exposed to projected light.
Figure 21:
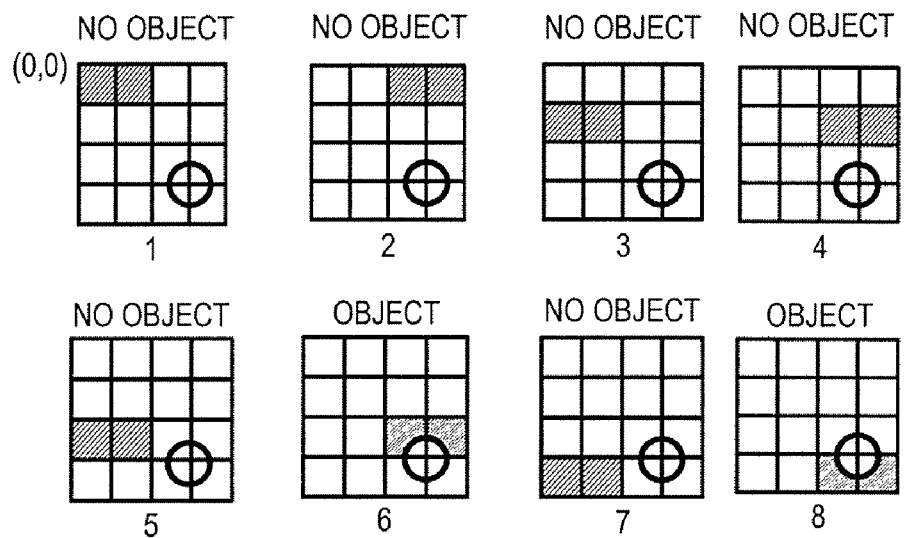
FIG. 21 shows processing of projection screen sectors by the apparatus of FIG. 20.
Figure 22:
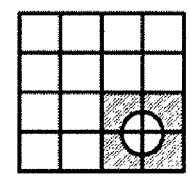
FIG. 22 shows the masked video data stream projected on to the projection screen.

In yet another embodiment as shown in FIGS. 20 to 22, a light sensing device 918 positioned above the projector 912 is used to detect the existence of a presenter positioned in front of the projection screen 916. As the projector horizontally scans the projection screen 916 to project the image onto the projection screen, the light sensing device 918 detects light that is reflected back towards it. Light reflected from the projection screen 916 reflects relatively uniformly while light reflected from a presenter does not. Light picked up by the light sensing device 918 is compared with known values determined during calibration in the absence of a presenter. When a presenter is positioned in front of the projection screen 916, the reflected light has a different luminosity and arrives at the light sensing device 918 sooner than it would if the light had traveled to the projection screen 916.

To detect the existence of the presenter, in this embodiment, the projection screen is divided into sectors. The computer 14 compares the output of the light sensing device 918 for each sector with calibration values to determine if a presenter is detected as shown in FIG. 21. Once the light sensing device output for all sectors has been processed, the video data stream input to the projector 912 is masked to set the pixels of each sector in which the presenter has been detected to black as shown in FIG. 22.

As will be appreciated in the above-described embodiments, the existence of a presenter in front of the projection screen is detected so that the video data stream used by a projector to project an image onto the projection screen can be masked to inhibit projected light from being directed at the presenter's eyes. The region of pixels that is masked can be of basically any shape and size so long as the region encompasses the presenter's eyes. Thus, the region can be sized and shaped to encompass only the presenter's eyes. Also, during modification, the pixels in the region need not be set to black or near black. The values of the pixels can be set to other levels provided the values avoid the presenter from being blinded by the projected light.

Although embodiments have been described with particular reference to the drawings, those of skill in the art will appreciate that variations and modifications may be made without departing from the spirit and scope thereof as defined by the appended claims.

What is claimed is:

1. In a projection system where a projector is used to project an image for display on a background, a method of inhibiting a subject's eyes from being exposed to projected light when the subject is positioned in front of the background, said method comprising:

capturing a pair of images of the background including the displayed image from different vantages using at least two camera devices;

processing the captured pair of images to detect the existence of a subject and to calculate generally the center of the subject's head and a geometrically shaped region generally centered about the center of the subject's head; and masking image data used by the projector to project the image, corresponding generally to said region.

2. The method of claim 1 wherein during said masking, pixels in said region are set to a black or near black level.

3. The method of claim 1 wherein during said processing, a disparity image based on the captured pair of images is generated.

4. The method of claim 3 wherein during said capturing, pairs of images are successively captured and mapped to one another, each pair of mapped images being processed to yield the disparity image.

5. The method of claim 4 wherein during processing, said disparity image is examined to determine if a subject exists therein, if so, said disparity image is thresholded prior to processing to detect generally the center of the subject's head.

6. The method of claim 5 further comprising tracking the subject's head over successively captured pairs of images and calculating an average center position, said average center position being used to calculate said geometrically shaped region.

7. The method of claim 6 further comprising calculating an average head velocity and using said average level velocity and average head position to calculate said geometrically shaped region.

8. The method of claim 4 wherein said disparity image is a statistical cross-correlation of each pair of mapped images.

9. The method of claim 4 wherein said disparity image is a weighted differential of each pair of mapped images.

10. The method of claim 4 wherein said disparity image is an absolute differential of each pair of mapped images.

11. The method of claim 4 wherein the images of each pair are mapped to one another via a transformation determined during calibration.

12. The method of claim 11 wherein said transformation is a homography transformation based on common features in captured images.

13. The method of claim 12 wherein said common features comprise features of a calibration image projected on said background.

14. The method of claim 13 wherein said calibration image is a graphical user interface.

15. The method of claim 14 wherein said common features are corners and wherein said common features further comprise corners of said background.

16. The method of claim 15 wherein said background is an electronic whiteboard.

17. The method of claim 5 wherein during thresholding, clusters of pixels representing said subject are isolated, said pixels clusters being examined to calculate generally the center of the subject's head.

18. The method of claim 17 wherein during processing to calculate generally the center of the subject's head, the center of said pixel clusters, the centerline of the subject and the outline of said subject are determined and examined to locate the position of the subject's head, said head position being used to determine the center of the subject's head.

19. The method of claim 3 wherein during said capturing, pairs of images are successively captured and mapped to one another, each pair of images being processed to detect the subject's shadow, said detected shadow being used to locate the subject's head.

20. The method of claim 1 wherein said processing further comprises:
examining the captured pair of images to detect interruption of a datum line therein thereby to detect the existence of the subject.

21. The method of claim 20 wherein said datum line is generally horizontal and is located adjacent the bottom of the displayed image.

22. The method of claim 21 wherein the datum line is the lower boundary of the displayed image.

23. The method of claim 21 wherein the datum line is a bright band in the displayed image.

24. The method of claim 21 wherein the datum light results from a band of light reflected by said background.

25. In a projection system where a projector is used to project an image for display on a background, a method of inhibiting a subject's eyes from being exposed to projected light when the subject is positioned in front of the background, said method comprising:
successively capturing sets of images of the background including the displayed image using at least two camera devices, each of said camera devices looking at said background from a different vantage;
processing each set of captured images to detect the existence of the subject and to calculate the center of the subject's head and a geometrically shaped region generally centered about the center of the subject's head; and
modifying image data used by the projector to project the image, in said region such that the displayed image comprises an area of darkness encompassing the subject's head.

26. The method of claim 25 wherein the images of each set are mapped to one another, the mapped images being processed to yield a disparity image.

27. The method of claim 26 wherein during processing, said disparity image is examined to determine if a subject exists therein, if so, said disparity image is thresholded prior to processing to calculate generally the center of the subject's head.

28. The method of claim 27 further comprising tracking the subject's head over successive sets of images and calculating an average center position, said average center position being used to calculate said geometrically shaped region.

29. The method of claim 28 wherein the images of each set are mapped to one another via a transformation determined during calibration.

30. The method of claim 29 wherein said transformation is a homography transformation based on common features in captured images.

31. The method of claim 30 wherein said common features comprise features of a calibration image projected on said background.

32. The method of claim 31 wherein said calibration image is a graphical user interface.

33. The method of claim 32 wherein said common features are corners and wherein said common features further comprise corners of said background.

34. The method of claim 27 wherein during thresholding, clusters of pixels representing said subject are isolated, said pixels clusters being examined to calculate generally the center of the subject's head.

35. The method of claim 34 wherein during processing to calculate generally the center of the subject's head, the center of said pixel clusters, the centerline of the subject and the outline of said subject are determined and examined to locate the position of the subject's head, said head position being used to determine the center of the subject's head.

36. A projection system comprising:
a projector receiving image data and projecting an image onto a background;
at least two camera devices, said camera devices capturing images of the background including the projected image from different vantages; and
processing structure processing the captured images to detect the existence of a subject and to calculate generally the center of the subject's head and a geometrically shaped region generally centered about the center of the subject's head and masking image data used by the projector to project the image, corresponding generally to said region.

37. A projection system according to claim 36 further comprising a video source providing the image data to said projector.

38. A projection system according to claim 37 wherein said video source is a computer.

39. A projection system according to claim 38 wherein said computer is coupled to said at least two camera devices and masks the image data.

40. A projection system according to claim 39 wherein during masking, said processing structure sets pixels in the region to a black or near black level.

41. A projection system according to claim 40 wherein said at least two camera devices successively capture image sets of the background including the projected image, said projection system mapping the images of each set to one another and processing the mapped images to yield a disparity image, said disparity image being examined to detect the existence of the subject and to locate the subject's head.

42. A projection system comprising:
a projector receiving image data and projecting an image onto a background;
a ranging sensor scanning the background to detect the existence of a subject in front of the background; and
processing structure communicating with the ranging sensor, said processing structure in response to said ranging sensor, calculating generally the center of the subject's head and a geometrically shaped region generally centered about the center of the subjects' head and masking the image data used by the projector to project the image corresponding generally to said region thereby to inhibit projected light from being directed at the subject's eyes.

43. A projection system according to claim 42 wherein said ranging sensor is a light sensing device.

44. A projection system according to claim 42 wherein said ranging sensor is a sound sensing device.

* * * * *